(12) United States Patent  
Williams

(10) Patent No.: US 9,325,094 B2  
(45) Date of Patent: Apr. 26, 2016

(54) DEVICE FOR POWERING BATTERY DEPENDENT EQUIPMENT WITH AC POWER

(71) Applicant: Scott G. Williams, Pottsville, PA (US)

(72) Inventor: Scott G. Williams, Pottsville, PA (US)

( * ) Notice: Subject to any disclaimer, the term of this patent is extended or adjusted under 35 U.S.C. 154(b) by 518 days.

(21) Appl. No.: 13/762,537

(22) Filed: Feb. 8, 2013

(65) Prior Publication Data

US 2013/0223102 A1 Aug. 29, 2013

Related U.S. Application Data

(60) Provisional application No. 61/603,829, filed on Feb. 27, 2012.

(51) Int. Cl.
| | |
|---|---|
| *H02J 7/02* | (2006.01) |
| *H01R 13/00* | (2006.01) |
| *H02M 7/02* | (2006.01) |
| *H01R 43/00* | (2006.01) |
| *H01R 31/06* | (2006.01) |

(52) U.S. Cl.  
CPC ............... *H01R 13/00* (2013.01); *H01R 31/06* (2013.01); *H01R 43/00* (2013.01); *H02M 7/02* (2013.01); *Y10T 29/49002* (2015.01)

(58) Field of Classification Search  
CPC ...................................................... H02J 7/0042  
USPC ............................................................. 320/111  
See application file for complete search history.

(56) References Cited

U.S. PATENT DOCUMENTS

| | | | | |
|---|---|---|---|---|
| 3,757,194 | A * | 9/1973 | Weber ................... | A01G 3/053 15/DIG. 1 |
| 6,286,609 | B1 * | 9/2001 | Carrier .................... | B25F 5/02 173/1 |
| 2008/0231236 | A1 * | 9/2008 | Watanabe ............. | H02J 7/0006 320/150 |
| 2015/0008747 | A1 * | 1/2015 | Salcone ................ | H02J 7/0068 307/66 |
| 2015/0136531 | A1 * | 5/2015 | Rogers ..................... | B66B 1/30 187/290 |
| 2015/0162782 | A1 * | 6/2015 | Kanakasabai ........... | H02J 9/061 307/23 |

* cited by examiner

*Primary Examiner* — Suresh Memula  
(74) *Attorney, Agent, or Firm* — Carla Gannon Law

(57) ABSTRACT

A device for powering battery dependent equipment with AC power includes faux batteries that correspond with standard and non-standard battery sizes and configurations; cables; and a means for connecting the faux batteries to an outlet. Instead of inserting batteries into the battery compartment of equipment, a user inserts the faux batteries, plugs the inventive device into a wall socket, and uses the device as usual. A variety of different configurations and components ensure safety and deliver the desired output.

8 Claims, 3 Drawing Sheets

DEVICE FOR POWERING BATTERY DEPENDENT EQUIPMENT WITH AC POWER

CROSS-REFERENCE TO RELATED APPLICATIONS

This application claims the benefit of U.S. Provisional Patent Application 61/603,829, filed Feb. 27, 2012.

BACKGROUND OF THE INVENTION

The present invention relates to powering accessories for battery-dependent equipment, and more specifically, to a device for powering battery depending equipment with AC power, with the device including faux batteries for use with equipment, cables electronically connecting the faux batteries to an outlet, and electronic components that ensure safety and control the voltage, amperage, and current draw.

Electrically powered equipment is typically configured to be powered either by plugging into an outlet, or by batteries. Whether the specific equipment is a plugged in (AC power), or powered by batteries (DC power) depends on a variety of factors, including the power requirements of the equipment, and intended use of the equipment. By way of example, electric can openers are typically corded, since they are commonly used in kitchens where electrical outlets are in abundance. Flashlights, on the other hand, typically include batteries so the flashlight can be used anywhere.

There are benefits and drawbacks of powering equipment with AC power, versus DC power. AC powered equipment can be more compact since it isn't necessary to include space for batteries, but AC powered equipment can only be used in the vicinity of an outlet. DC powered equipment is convenient insofar as an electrical outlet is not necessary, but replacing batteries can be burdensome and expensive.

Certain electronic equipment is manufactured to be battery powered, but for a variety of reasons it is deemed desirable to use AC power for the equipment. For example, portable store displays having features such as blinking lights are typically configured to run on batteries, since outlets are not necessarily available where it is desirable to position a store display. However, sometimes these store displays are positioned near an outlet, thereby rendering the burden and expense of replacing batteries unnecessary. Rather, it would be desirable to plug the store display into an outlet.

As can be seen, there is a need for a device that allows battery dependent equipment to be powered by AC power. It is desirable that this device includes components that ensure safety and control the voltage, amperage, and current draw. It is also desirable that this device is easy to use and transport. It is also desirable that little or no retrofitting is required to the underlying equipment when this device is used. It is also desirable that this device can be easily removed from underlying equipment, without damaging said equipment, such that the equipment can subsequently be powered by batteries. It is also desirable that this device can be used with equipment that requires different sized batteries, different power requirements, and different quantities of batteries.

SUMMARY OF THE INVENTION

This invention pertains to powering devices that use AC electrical energy and supply DC electrical energy to battery dependent equipment by providing at least one faux battery; a cable electrically coupled to said at least one faux battery; and an intermediary connector electrically coupled to said cable. The faux battery is substantially similar in size and shape to conventional 6V, D, C, AA, AAA, 9V, and/or other types of batteries. The device may include components such as resistors, capacitors, integrated circuits, transistors, fuses and other suitable electronic components, and combinations thereof. The device may include a power supply electrically coupled to the intermediary connector.

The invention also pertains to a system having battery dependent equipment powered by AC electricity, with the off-the-shelf equipment including at least one wired battery compartment configured to supply DC to said equipment. This system includes at least one faux battery engaged with at least one wired battery compartment; a cable connected to at least one faux battery; and a power supply electrically coupled to said cable. This system may include an intermediary connector electrically spanning said cable and said power supply, with that intermediary connector desirably releasably engaged with said power supply. In this system the quantity of wired battery compartments in the equipment may or may not be equal to the quantity of faux batteries.

This invention also pertains to a method of modifying battery dependent equipment to operate on AC electricity including the steps of: removing a lid from equipment to expose a first battery compartment; inserting a first faux battery into said first battery compartment, said first faux battery electrically coupled to an power supply; replacing said lid; and plugging said power supply into an AC outlet. This method may further include the step of removing a section of said lid to form a channel, and passing a section of cable through said channel. The method may also include the steps of exposing a second battery compartment and inserting a second faux battery into said second battery compartment, said second faux battery electrically coupled to said power supply. The faux batteries may be the approximate size and shape of conventional 6V, D, C, AA, AAA, 9V, and/or button batteries, or any other size or shape, including cell phone batteries, car batteries and computer batteries. The inventive method may also include the step of electrically coupling said first faux battery with said power supply by engaging an intermediary connector with said power supply.

BRIEF DESCRIPTION OF THE DRAWINGS

FIG. 3B demonstrating a user snipping off a corner of a lid; and FIG. 3C showing a cable passing through a hole created by the snipped corner.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, the following structure numbers apply to the following parts throughout the various FIGS.:

10—Powering device;
15—Faux battery;
20—Cable;
25—Intermediary connector;
30—Power supply;
35—Component;

50—Equipment;
55—Housing;
57—Lid; and
60—Battery compartment.

Figure 1:
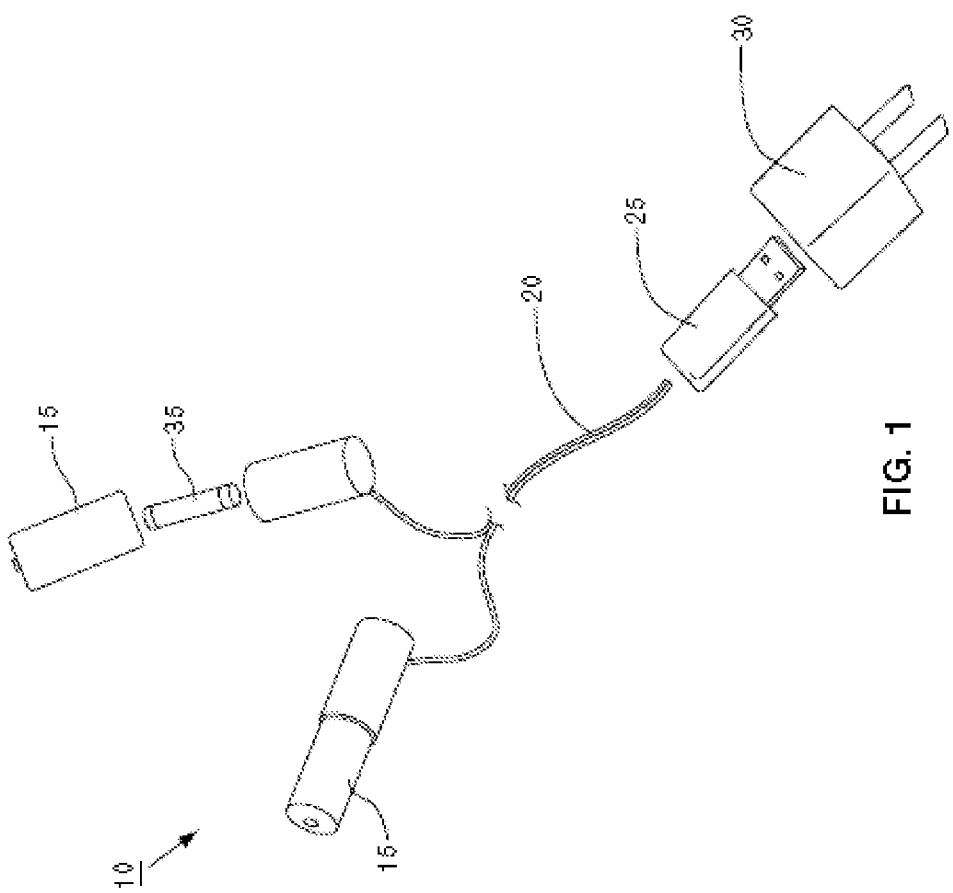
FIG. 1 depicts an embodiment of the present invention, with the component within the right faux battery shown.

Referring to FIG. 1, powering device 10 generally includes at least one faux battery 15, each individually connected by cable 20 to intermediary connector 25, which terminates in power supply 30.

Faux batteries 15 depicted in FIG. 1 are substantially the same size and shape of so-called "AA battery" type, but it should be understood that a variety of standard battery types, including 6V, D, C, AA, AAA, 9V, and button batteries; variable batteries such as cell phone, car and computer batteries; and even custom sized batteries, are all within the scope of this invention. Indeed, the specific type and quantity of faux batteries is dependent upon the configuration and electrical need of the equipment to be powered, and especially the layout of battery compartments 60.

In conventional battery-dependent equipment, the batteries, regardless of the quantity, connect only at the positive (+) and negative (−) terminals. Similarly, faux batteries 15 are set up such that the positive current (+) from power supply 30 goes to the positive end of first faux battery 15, while negative current (−) goes to the other end of last faux battery 15 in series. Both positive end and negative end would be on same faux battery if there is only one faux battery. Accordingly, in the configuration of FIG. 2 it is possible, although not necessary, to include an unwired "blank" faux battery to fill space in empty battery compartments 60. Alternatively, if equipment 50 were a flashlight requiring three batteries stacked end-to-end, it would be desirable to include unwired faux battery between two faux batteries 15, so as to complete the electrical connection.

In order to achieve the desired power output, voltage and circuit protection, and/or to introduce other features such as light sensors, power switches, motion sensing or timer functions, it may be desirable to include certain components 35 in the electrical circuitry of powering device 10. For illustrative purposes, FIG. 1 depicts component 35 within faux battery 15, although the component may be located in various positions on powering device 10, including along cable 20, within power supply 30, and/or in associated with intermediary connector 25. Component 35 may be a variety of conventional electrical components such as resistors, capacitors, integrated circuits, transistors, fuses, and combinations thereof.

The following three examples are not exhaustive, but illustrate some configurations and performance parameters achievable by the present invention:

In a first example, two AA type faux batteries 15 are electrically linked to power supply 30, as shown in the various FIGS. In addition, a voltage reducing circuit having electrical components such as resistors, capacitors, integrated circuits, transistors, fuses and other suitable electronic components is positioned at intermediary connector 25. The resulting powering device 10 provides 3 volts, and is suitable for use with, for example, lighted canvas wall art from Ohio Wholesale of Seville, Ohio.

In a second example, three AA type faux batteries 15 are electrically linked to power supply 30, as shown in the various FIGS. In addition, a timer circuit having electrical components such as resistors, capacitors, integrated circuits, transistors, fuses and other suitable electronic components is positioned at cable 20. The resulting powering device 10 provides 4.5 volts, includes an on/off timing cycle, and is suitable for use with, for example Roman 7.5" battery operated LED lighted winter village scene, from Bloomingdale, Ill.

In a third example, three AA type faux batteries 15 are electrically linked to power supply 30, as shown in the various FIGS. In addition, a light sensing circuit having electrical components such as resistors, capacitors, integrated circuits, transistors, fuses and other suitable electronic components is positioned at power supply 30. The resulting powering device 10 provides 4.5 volts, and includes a light sensing circuit which powers the device on when dark, and off when light, and is suitable for use with, for example, battery operated pillar candles from Oddity, Inc. of Pottsville, Pa.

Faux batteries 15 are preferably constructed of non-conductive material such as plastic, with terminal ends constructed of conductive material such as copper or other metals. Faux batteries 15 of a given powering device 10 are of suitable size and shape to fit the device to be powered.

Cable 20 facilitates electrical communication between faux batteries 15 and intermediary connector 25. Cable 20 is preferably constructed of copper or other suitable conductive materials of proper gauge to support the current necessary for the device to be powered, and is preferably insulated with plastic or other suitable insulating materials.

Cable 20 preferably terminates in intermediary connector 25, which electrically links with power supply 30. It is desirable that intermediary connector is releaseably engaged, preferably slidably engaged, with power supply 30. Intermediary connector can be of a conventional configuration including USB-type, DIN plug, 1.8 plug, $1/16$ plug, and so forth, or of a custom design. Alternatively, cable 20 can be directly hard wired with power supply 30.

Device 10 desirably terminates at power supply 30, of the appropriate specifications. By way of example, equipment 50 of FIG. 2 requires 4.5 volts for operation, and is therefore configured with three AA (1.5 volts each) battery compartments 60. The cumulative voltage of three 1.5 volt batteries in series is 4.5 volts. Thus, equipment 50 of FIG. 2 could be operated using powering device 10 having power supply 30 output of 4.5 volts. An example of a commercially available power supply is the 4.5V/700 mA AC Adaptor Model 273-353 from ENERCELL, available from RadioShack of Ft. Worth, Tex.

Figure 2:
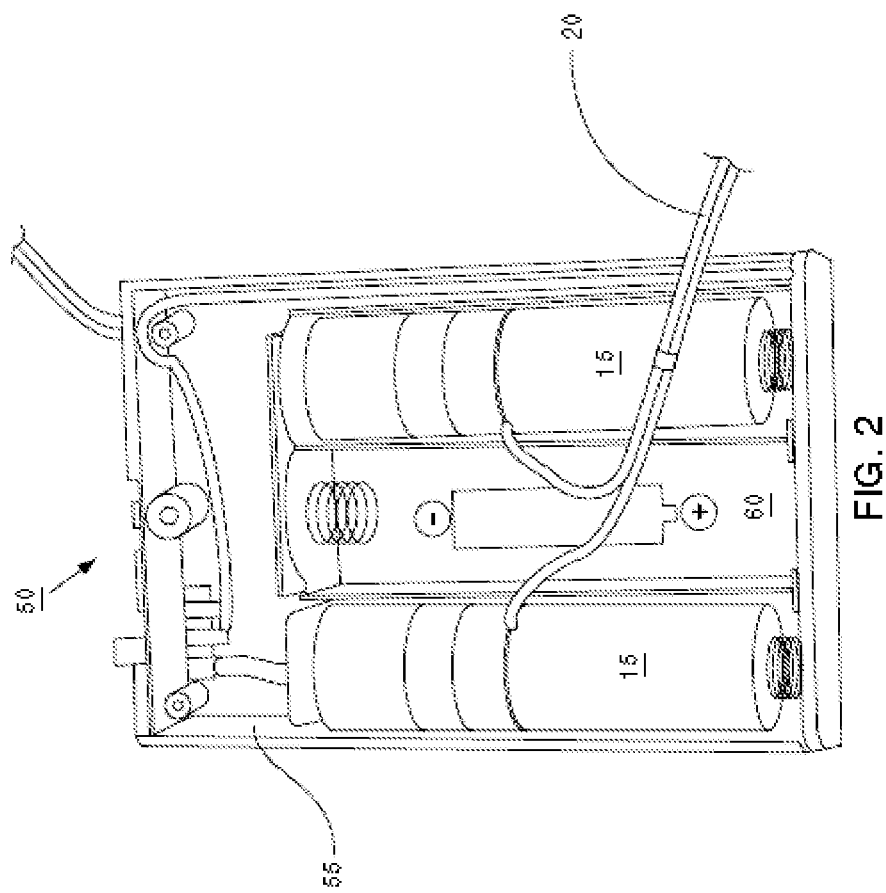
FIG. 2 depicts a view inside the housing of equipment.

As shown in FIG. 2, equipment 50 includes housing 55, which includes a plurality of battery compartments 60. As used herein, equipment 50 refers to apparatuses that are manufactured to be powered by conventional batteries such as zinc-carbon, alkaline cell and rechargeable batteries. Equipment 50 includes housing 55 for retaining the batteries of a device in a specific region, with battery compartments 60 holding each individual battery. FIG. 2 depicts three battery compartments 60, although only the center compartment is numbered, the outlying two each containing one faux battery 15. Battery compartments 60 conventionally include conductive tabs or coils for contact with positive or negative terminals of battery, and are wired for delivering power to the equipment. FIG. 2 depicts an unnumbered coil corresponding with negative terminal of unnumbered battery position diagram.

In use, a user would select the desired configuration of device 10 in accordance with the specifications, for example the power requirements and number of battery compartments 60 of equipment 50. The user would then access housing 55, likely by removing lid 57. Faux batteries 15 would then be positioned in battery compartments 60, making sure that polarity is correctly oriented. Cable 20 is directed outwards from housing 55, lid 57 is replaced, and power supply 30 is plugged into standard wall socket. It may also be desirable to ensure that intermediary connector 25 is securely connected with power supply 30. Finally, equipment 50 is ready for ordinary use.

Figure 3:
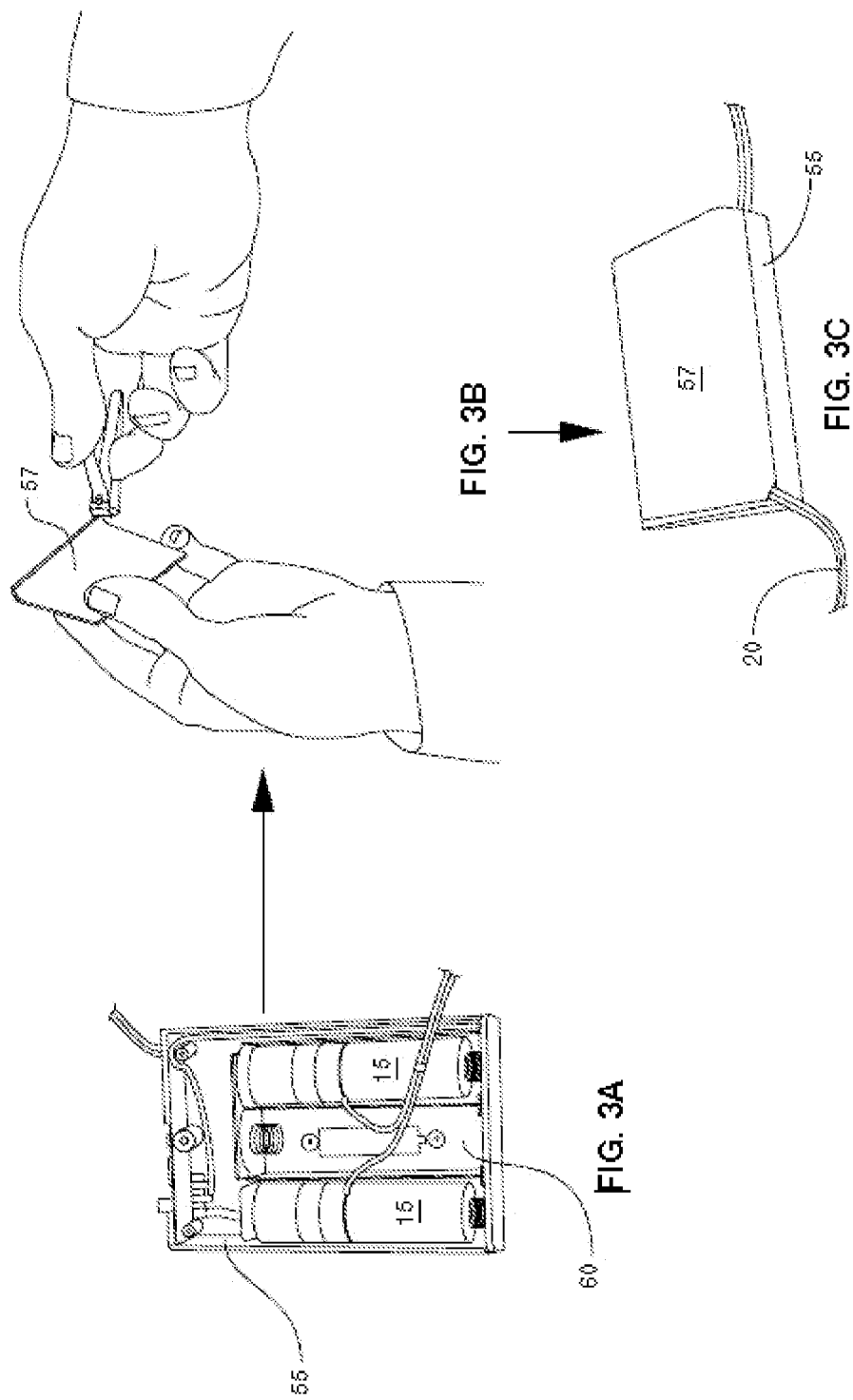
FIG. 3 sets forth several steps in a method of the present invention, with FIG. 3A depicting the device with faux batteries in place.

Although cable 20 is thin, closure of lid 57 may be impeded by protrusion of cable 20. In such a situation it may be desirable to form a channel on lid 57, for example by removing a corner or otherwise creating a notch, that cable 20 can pass through. This is depicted in FIG. 3.

It should be understood, of course, that the foregoing relates to exemplary embodiments of the invention and that modifications may be made without departing from the spirit and scope of the invention as set forth in the following claims. It should also be understood that ranges of values set forth inherently include those values, as well as all increments between.

What is claimed is:

1. A powering device for battery dependent equipment including:
    A) At least one faux battery including a fuse;
    B) A cable electrically coupled to said at least one faux battery; and
    C) An intermediary connector electrically coupled to said cable.

2. The device of claim 1 wherein said at least one faux battery is selected from the types consisting of 6V, D, C, AA, AAA, 9V, button, cell phone, car, computer and combinations thereof.

3. The device of claim 1 further including a power supply electrically coupled to said intermediary connector.

4. The device of claim 3 wherein said power supply is configured to fit a standard outlet selected from the group consisting of 110 V, 220 V and 12 V.

5. A system having battery dependent equipment powered by AC electricity, said system including:
    A) Equipment including at least one wired battery compartment configured to supply DC electricity to said equipment;
    B) At least one faux battery engaged with at least one wired battery compartment;
    C) A cable connected to at least one faux battery; and
    D) A power supply electrically coupled to said cable, wherein the quantity of said wired battery compartments is different from the quantity of said faux batteries.

6. The system of claim 5 further including an intermediary connector electrically spanning said cable and said power supply.

7. The system of claim 6 wherein said intermediary connector is releasably engaged with said power supply.

8. The system of claim 7 wherein said intermediary connector is slideably engaged with said power supply.

* * * * *